United States Patent Office 3,297,685
Patented Jan. 10, 1967

3,297,685
PROCESS FOR THE PREPARATION OF 2-OXO BENZODIAZEPINES
Joseph Hellerbach, Basel, Switzerland, and Werner Metlesics, Clifton, and Leo Henryk Sternbach, Upper Montclair, N.J., assignors to Hoffmann-La Roche Inc., Nutley, N.J., a corporation of New Jersey
No Drawing. Filed Aug. 9, 1965, Ser. No. 478,429
4 Claims. (Cl. 260—239.3)

This invention relates to a novel process for the preparation of known pharmaceutically useful benzodiazepines and to novel intermediates useful in the preparation thereof. More particularly, the novel process of this invention comprises treating a compound of the formula

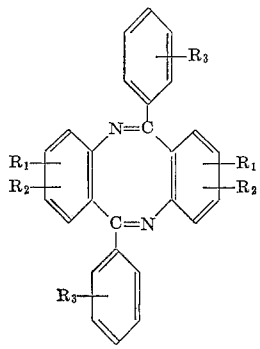

I wherein $R_1$, $R_2$ and $R_3$ are each independently selected from the group consisting of hydrogen, halogen, lower alkyl, lower alkoxy, nitro, trifluoromethyl, cyano, lower alkylthio, lower alkylsulfinyl and lower alkylsulfonyl with a quaternizing agent thereby forming a monoquaternary imonium salt of the formula

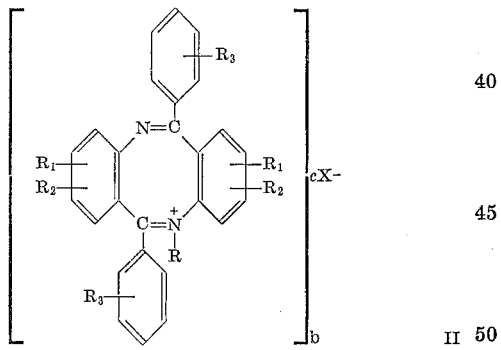

II wherein $R_1$ through $R_3$ have the same significance as above; R is lower alkyl or benzyl; X is the anionic moiety of the quaternizing agent employed in the reaction, and b and c are positive numbers such that the positive charge of b moles of cation is neutralized by c moles of anion X or a diquaternary imonium salt of the formula

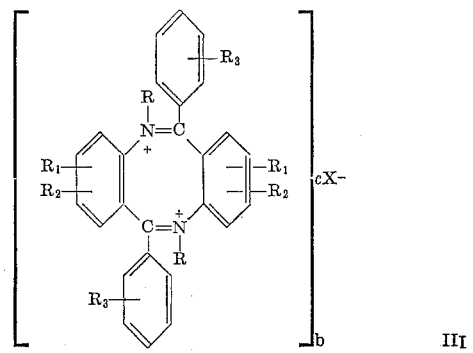

III wherein the symbols R, $R_1$, $R_2$, $R_3$, X, b and c have the same significance as like symbols hereinabove.

On treatment with amino acid derivatives such as amino acid esters, e.g., glycine ethyl ester, or its C-substituted derivatives the quaternary salts of Formulas II and III are converted to the known compounds of the formula

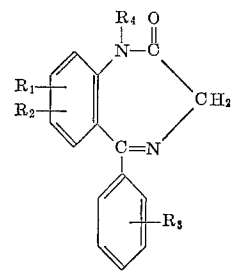

IV wherein R, $R_1$, $R_2$ and $R_3$ have the same significance as hereinabove and $R_4$ is hydrogen or lower alkyl. Hydrolysis of the compounds of Formula III wherein R is lower alkyl yields lower alkylamino benzophenones of the formula

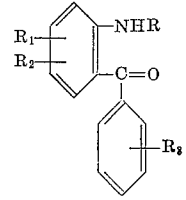

V wherein R, $R_1$, $R_2$ and $R_3$ have the same significance as hereinabove. Thus, the invention also provides a new and useful method for the monoalkylation of o-aminobenzophenones. The hydrolysis is conveniently effected by simply dissolving in aqueous solution at room temperature though higher or lower temperature could also be employed. The hydrolysis could also be effected in an aqueous base or aqueous acid solution.

The starting materials, ie., the compounds of Formula I above, are prepared by treating substituted aminobenzophenones of the formula

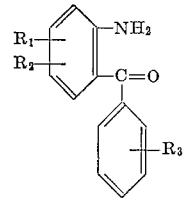

VI wherein $R_1$, $R_2$ and $R_3$ have the same significance as above in a solvent in the presence of a Friedel-Crafts catalyst such as, for example, $AlCl_3$, $TiCl_4$, $SnCl_4$, $SbCl_4$, $BF_3$, etc. This reaction is preferably carried out by refluxing the appropriate aminobenzophenones in chlorobenzene in the presence of one of the above-indicated catalysts. Exemplary compounds of Formula I prepared in this way are 2,8-dichloro-6,12-diphenyldibenzo[b,f] [1,5]diazocine, 2,8-dinitro - 6,12 - diphenyldibenzo[b,f][1, 5]diazocine, 2,8-difluoro-6,12-diphenyldibenzo[b,f] [1,5] diazocine, 2,8-dibromo-6,12-diphenyldibenzo[b,f] [1,5]diazocine, 2,8 - dimethoxy-6,12-diphenyldibenzo[b,f][1,5]diazocine, 2,8-dibromo - 6,12 - bis(o-fluorophenyl)-dibenzo [b,f][1,5]diazocine, 2,8 - dichloro - 6,12 - bis(o-methoxyphenyl)-dibenzo[b,f][1,5]diazocine, 2,8-dichloro-6,12-bis (m-chlorophenyl)-dibenzo[b,f][1,5]diazocine, 2,8-dichloro-6,12-bis(p-fluorophenyl) - dibenzo[b,f][1,5]diazocine, 3,9 - dichloro - 6,12 - diphenyldibenzo[b,f][1,5]diazocine, 1,7-dichloro-6,12-diphenylbenzo[b,f][1,5]diazocine, and 2,3,8,9 - tetrachloro - 6,12 - diphenyldibenzo[b,f] [1,5]diazocine.

The preferred starting materials for the processes of this invention are the compounds of Formula I wherein one of $R_1$ and $R_2$ is hydrogen and the other of $R_1$ and $R_2$ is in the 2- and 8-positions of the diphenyldibenzo[b,f][1,5]diazocine molecule and is either hydrogen, halogen, particularly either chlorine or bromine, trifluoromethyl or nitro and $R_3$ is in the ortho-position and is either hydrogen, fluorine, chlorine or trifluoromethyl.

The imonium salts of Formula II are prepared by any of the usual quaternizing techniques employing the ordinary quaternizing agents such as, for example, by the reaction of alkylating agents such as alkyl halide, benzyl halide, alkyl nitrate, trimethyl phosphate, or alkyl sulfate or by reaction with esters of other strong organic acids such as methyl sulfinate, p-toluenesulfonate, benzenesulfonate etc. Thus the anionic moiety of the imonium salt represented by the symbol X in Formulas II and III figures as the anionic moiety of the quaternizing agent, for example, halide, e.g. bromide, chloride, iodide, methosulfate, methophosphate, etc. The quaternization reaction can be suitably carried out by adding an alkylating agent to a solution of the appropriate Formula I compound in an inert organic solvent. The reaction can also be carried out in the absence of any solvent. Illustrative of the solvents which may be used as the reaction medium are hydrocarbons such as benzene, chlorobenzene, toluene, nitromethane, dioxane, tetrahydrofuran, acetone, etc. The reaction temperature is not critical though it is preferred to carry out the process at between about room temperature and the boiling point of the reaction mixture. The proportions of the reactants employed are not critical though it is preferred to use an excess of the quaternizing agent. The diquaternary salts of Formula III can be prepared by further reacting the monoquaternary salts with a quaternizing agent as above or they can be obtained directly by employing more vigorous reaction conditions, i.e. higher temperature, longer reaction times, higher concentration of reactants, a greater ratio of alkylating agent to starting material etc. Among the substituted diphenyldibenzo[b,f][1,5] diazocinium quaternary salts formed according to the present invention are 2,8-dichloro-5-methyl-6,12-diphenyldibenzo[b,f][1,5]diazocinium methosulfate, 2,8-difluoro-5-methyl-6,12-diphenyldibenzo[b,f][1,5]diazocinium methosulfate, 2,8 - dibromo - 5 - methyl - 6,12 - diphenyldibenzo[b,f][1,5]diazocinium methosulfate, 2,8-dimethoxy-5-methyl-6,12-diphenyldibenzo[b,f][1,5]diazocinium methosulfate, 2,8 - dibromo - 5 - methyl - 6,12 - bis(o - fluorophenyl)-dibenzo[b,f][1,5]diazocinium methosulfate, 2,8-dichloro-5 - methyl - 6,12 - bis(o - methoxyphenyl) - dibenzo[b,f][1,5]diazocinium methosulfate, 2,8-dichloro-5-methyl-6,12 - bis(m - chlorophenyl) - dibenzo[b,f][1,5]diazocinium methosulfate, 2,8 - dichloro - 5 - methyl - 6,12 - bis (p - fluorophenyl) - dibenzo [b,f][1,5]diazocinium methosulfate, 3,9 - dichloro - 5 - methyl - 6,12 - diphenyldibenzo[b,f][1,5]diazocinium methosulfate, 1,7 - dichloro-5 - methyl - 6,12 - diphenyldibenzo[b,f][1,5]diazocinium methosulfate, 2,3,8,9 - tetrachloro - 5 - methyl - 6,12 - diphenyldibenzo[b,f][1,5]diazocinium methosulfate, and the corresponding -5,11-dimethyl compounds.

The reaction of the diazocinium quaternary salt with an amine is preferably carried out in the presence of an organic base solvent which is inert under the reaction conditions. The reaction is preferably carried out at a temperature between about room temperature and the boiling point of the reaction mixture though lower temperatures could also be utilized. The compounds of Formula IV, as previously indicated, are known pharmaceutically useful compounds. They are useful, for example, as sedatives, muscle relaxants and anti-convulsants. The 1,3-dihydro-5-phenyl-2H-1,4-benzodiazepine-2-ones of Formula IV prepared by this method are, for example, the 7-bromo-, 7-methoxy-, 7-bromo-2'-fluoro-, 7 - chloro - 2'-methoxy-, 7-chloro-3'-chloro, 7-chloro-4'-fluoro-, 8-chloro-, 6-chloro-, and 7,8-dichloro- derivatives as well as the 1-methyl derivatives corresponding to each of the above. Compounds of Formula IV wherein $R_3$ is in the 2'-position and $R_1$ and $R_2$ are either hydrogen, halogen, nitro or trifluoromethyl and one of $R_1$ and $R_2$ is hydrogen are preferred. More preferable are such compounds wherein one of $R_1$ and $R_2$ is hydrogen and the other is joined to 7-position of the benzodiazepine nucleus.

The following examples are illustrative but not limitative of the invention. All temperatures are in degrees centigrade and all melting points are corrected.

Example 1

23.2 g. (0.10 m.) of 5-chloro-2-aminobenzophenone is added in small portions to a stirred, cooled suspension of 0.10 mole of aluminum chloride in 300 ml. of chlorobenzene. After the addition, the mixture is heated, whereupon a large quantity of hydrogen chloride evolves and a dark solution forms. The mixture is refluxed for 3 hours, then cooled, poured on a sufficient quantity of ice, made basic with aqueous sodium hydroxide and extracted with dichloromethane. The extract is washed with water and dried over anhydrous sodium sulfate. The solvent is removed under vacuum giving a residue which crystallizes upon addition of ethanol. The crystalline residue is recrystallized from a mixture of dichloromethane and ethanol to give 2,8-dichloro-6,12-diphenyldibenzo[b,f][1,5]diazocine in the form of yellow prisms, having a melting point of 215–217° C.

Example 2

A solution of 86 g. (0.2 mole) of 2,8-dichloro-6,12-diphenyldibenzo[b,f][1,5]diazocine in 450 ml. of benzene and 50 ml. (0.54 mole) of dimethyl sulfate is heated to reflux for 16 hours. On cooling the red solution precipitates yellow crystals which are collected on a filter and washed with benzene. Recrystallization from a mixture of methylene chloride and ether gives tan prisms of 2,8 - dichloro - 5-methyl-6,12-diphenyldibenzo[b,f][1,5] diazocinium methosulfate melting at ca. 150–205° (dec.).

Example 3

A solution of 4.4 g. of 2,8-dichloro-5-methyl-6,12-diphenyldibenzo[b,f][1,5]diazocinium methosulfate and 13.3 g. of glycine ethyl ester hydrochloride in 30 ml. of pyridine was heated to reflux for 40 hours. The solution was concentrated in vacuo. The residue was dissolved in methylene chloride and washed with aqueous sodium hydroxide. The methylene chloride was removed on a steam bath and the residue was dissolved in ether. Crystals of 7-chloro-1,3-dihydro-5-phenyl-2H-1,4-benzodiazepine-2-one formed which after recrystallization from methanol melted at 212–215°.

Example 4

A solution of 43 g. (0.1 mole) of 2,8-dichloro-6,12-diphenyldibenzo[b,f][1,5]diazocine in 100 ml. of dimethylsulfate and 20 ml. of benzene was heated to reflux for 10 minutes. Then 80 ml. of benzene was added and the solution was heated to reflux for 4 hours. On standing overnight, crystals separated which were collected on a filter and washed with benzene. The 2,8-dichloro-5,11 - dimethyl - 6,12 - diphenyldibenzo[b,f][1,5]diazocinium methosulfate was used without further purification.

Example 5

A solution of 6.8 g. (0.01 mole) of 2,8-dichloro-5,11-dimethyl - 6,12 - diphenyldibenzo[b,f][1,5]diazocinium methosulfate and 13.9 g. of glycine ethyl ester hydrochloride (0.1 mole) in 50 ml. of methanol was heated to reflux for 6 hours. The methanol was removed in vacuo and the residue was dissolved in 50 ml. of pyridine and heated to reflux for 16 hours. The pyridine was removed in vacuo and the residue was dissolved in ether and filtered through 50 g. of alumina (grade 1, basic, Woelm). Further washing with ether removed 5-chloro-2-methylamino-benzophenone. The alumina was washed with ethyl acetate and this filtrate on evaporation left a residue that crystallized from a mixture of ethanol and petroleum ether to give white prisms of 7-chloro-1-methyl-5-phenyl-3H-1,4-benzodiazepin-2(1H)-one melting at 130–134°. This product melted undepressed on a mixture of 7-chloro-1-methyl-5-phenyl-3H-1,4-benzodiazepin-2(1H)-one.

*Example 6*

A solution of 2.5 g. of the crude product 2,8-dichloro-5,11 - dimethyl - 6,12 - diphenyldibenzo[b,f][1,5]diazocinium methyl sulfate in 20 ml. of methanol and 20 ml. of 20 percent hydrochloric acid was heated on a steam bath for 1 hour. The solution was concentrated in vacuo, poured into ice water and made basic with ammonia. Yellow needles of 2-methylamino-5-chlorobenzophenone were obtained melting at 95–97°.

We claim:

1. A process for preparing a compound of the formula

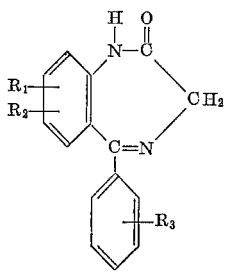

wherein $R_1$, $R_2$ and $R_3$ are each independently selected from the group consisting of hydrogen, halogen, lower alkyl, lower alkoxy, nitro, trifluoromethyl, cyano, lower alkylthio, lower alkylsulfinyl and lower alkylsulfonyl which comprises reacting a compound of the formula

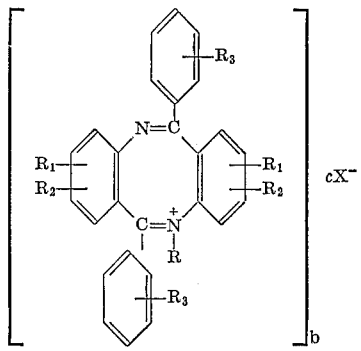

wherein $R_1$, $R_2$ and $R_3$ are each independently selected from the group consisting of hydrogen, halogen, lower alkyl, lower alkoxy, nitro, trifluoromethyl, cyano, lower alkylthio, lower alkylsulfinyl and lower alkylsulfonyl; R is lower alkyl or benzyl; X is an organic or inorganic anion and $b$ and $c$ are positive members such that the positive charge of $b$ moles of cation is neutralized by $c$ moles of anion with an amino acid ester.

2. A process of preparing 7-chloro-1,3-dihydro-5-phenyl-2H-1,4-benzodiazepin-2-one by reacting 2,8-dichloro-5-methyl - 6,12 - diphenyldibenzo[b,f][1,5]diazocinium methosulfate with glycine ethyl ester.

3. A process for preparing a compound of the formula

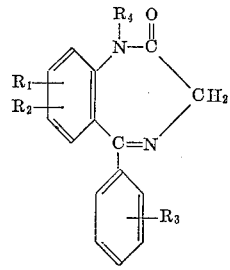

where $R_1$, $R_2$ and $R_3$ are each independently selected from the group consisting of hydrogen, halogen, lower alkyl, lower alkoxy, nitro, trifluoromethyl, cyano, lower alkylthio, lower alkylsulfinyl and lower alkylsulfonyl and $R_4$ is lower alkyl or benzyl which comprises reacting a compound of the formula

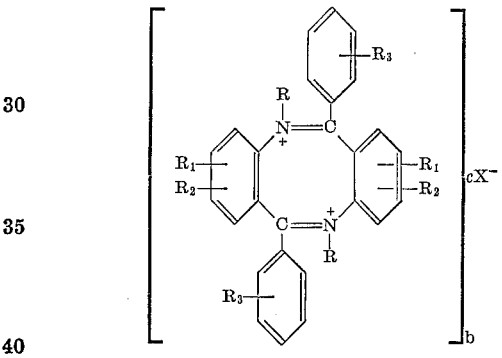

wherein $R_1$, $R_2$ and $R_3$ are each independently selected from the group consisting of hydrogen, halogen, lower alkyl, lower alkoxy, nitro, trifluoromethyl, cyano, lower alkylthio, lower alkylsulfinyl and lower alkylsulfonyl; R is lower alkyl or benzyl; X is an organic or inorganic anion and $b$ and $c$ are positive members such that the positive charge of $b$ moles of cation is neutralized by $c$ moles of anion with an amino acid ester.

4. A process for preparing 7-chloro-1-methyl-5-phenyl-3H-1,4-benzodiazepin-2-(1H)-one which comprises reacting 2,8-dichloro-5,11-dimethyl - 6,12 - diphenyldibenzo[b,f][1,5]diazocinium methosulfate with glycine ethyl ester.

No references cited.

ALEX MAZEL, *Primary Examiner.*

ALTON D. ROLLINS, *Examiner.*